United States Patent [19]
Baldwin

[11] 4,352,129
[45] Sep. 28, 1982

[54] DIGITAL RECORDING APPARATUS

[75] Inventor: John L. E. Baldwin, Eastleigh, England

[73] Assignee: Independent Broadcasting Authority, London, England

[21] Appl. No.: 117,511

[22] Filed: Feb. 1, 1980

[51] Int. Cl.³ .................... H04N 5/78; H03K 13/24
[52] U.S. Cl. ............................... 360/32; 340/347 DD
[58] Field of Search .................................. 364/900, 34; 340/347 DD, 146.1 AB; 360/32, 33, 34; 358/127

[56] References Cited

U.S. PATENT DOCUMENTS

| | | | |
|---|---|---|---|
| 2,950,469 | 8/1960 | Raasch | 340/347 AD |
| 3,235,661 | 2/1966 | Oxley | 340/347 DD |
| 3,403,231 | 9/1968 | Slaton | 360/34 |
| 3,544,779 | 12/1970 | Farrow | 340/347 AD |
| 3,631,471 | 12/1971 | Griffiths | 340/347 DD |
| 3,753,113 | 8/1973 | Maruta | 340/347 DD |
| 3,798,360 | 3/1974 | Feistel | 340/347 DD X |
| 3,909,721 | 9/1975 | Bussgang | 340/146.1 AB |
| 3,970,790 | 7/1976 | Guanella | 340/347 DD X |
| 4,041,453 | 8/1977 | Umeda | 340/347 DD |

Primary Examiner—Charles D. Miller
Attorney, Agent, or Firm—Laubscher, Philditt & Laubscher

[57] ABSTRACT

Apparatus for decreasing the d.c. component of digital signals derived from an analogue signal which may be a television video or audio signal, comprises analogue to digital converter means for producing digital words corresponding to samples of the analogue signal, a memory device for subjecting the words to a specific code conversion and circuitry for combining the coded words together in groups of two words with one of the words ones complemented and preferably partially interleaved with the other of the words of each group. The apparatus is applicable to use for both the recording of color T.V. video signals as well as for the transmission of such signals.

4 Claims, 4 Drawing Figures

|  | PCM | Code |  | PCM | Code |
|---|---|---|---|---|---|
| No | 12345678 | 123P45678 | No | 12345678 | 123P45678 |
| 0 | 00000000 | 100000000 | 45 | 00101101 | 001000101 |
| 1 | 00000001 | 010000000 | 46 | 1110 | 001000110 |
| 2 | 00000010 | 001000000 | 47 | 1111 | 001001001 |
| 3 | 00000011 | 000100000 | 48 | 00110000 | 001001010 |
| 4 | 00000100 | 011100000 | 49 | 0001 | 001001100 |
| 5 | 00000101 | 101100000 | 50 | 0010 | 001010001 |
| 6 | 00000110 | 110100000 | 51 | 0011 | 001010010 |
| 7 | 00000111 | 111000000 | 52 | 0100 | 001010100 |
| 8 | 00001000 | 100000011 | 53 | 0101 | 001011000 |
| 9 | 00001001 | 100000001 | 54 | 0110 | 010000011 |
| 10 | 00001010 | 100000010 | 55 | 0111 | 010000101 |
| 11 | 00001011 | 010000001 | 56 | 1000 | 010000110 |
| 12 | 00001100 | 111000001 | 57 | 1001 | 010001001 |
| 13 | 00001101 | 011110000 | 58 | 1010 | 010001010 |
| 14 | 00001110 | 101110000 | 59 | 1011 | 010001100 |
| 15 | 00001111 | 110110000 | 60 | 1100 | 010010001 |
| 16 | 00010000 | 111010000 | 61 | 1101 | 010010010 |
| 17 | 0001 | 000110000 | 62 | 1110 | 010010100 |
| 18 | 0010 | 100010000 | 63 | 1111 | 010011000 |
| 19 | 0011 | 010010000 | 64 | 01000000 | 100000101 |
| 20 | 0100 | 001010000 | 65 | 0001 | 100000110 |
| 21 | 0101 | 000100001 | 66 | 0010 | 100001001 |
| 22 | 0110 | 000100010 | 67 | 0011 | 100001010 |
| 23 | 0111 | 000100100 | 68 | 0100 | 100001100 |
| 24 | 1000 | 000101000 | 69 | 0101 | 100010001 |
| 25 | 1001 | 001000001 | 70 | 0110 | 100010010 |
| 26 | 1010 | 001000010 | 71 | 0111 | 100010100 |
| 27 | 1011 | 001000100 | 72 | 1000 | 100011000 |
| 28 | 1100 | 001001000 | 73 | 1001 | 000100111 |
| 29 | 1101 | 010000010 | 74 | 1010 | 000101011 |
| 30 | 1110 | 010000100 | 75 | 1011 | 000101101 |
| 31 | 1111 | 010001000 | 76 | 1100 | 000101110 |
| 32 | 00100000 | 100000100 | 77 | 1101 | 000110011 |
| 33 | 0001 | 100001000 | 78 | 1110 | 000110101 |
| 34 | 0010 | 000100011 | 79 | 1111 | 000110110 |
| 35 | 0011 | 000100101 | 80 | 01010000 | 000111001 |
| 36 | 0100 | 000100110 | 81 | 0001 | 000111010 |
| 37 | 0101 | 000101001 | 82 | 0010 | 000111100 |
| 38 | 0110 | 000101010 | 83 | 0011 | 001000111 |
| 39 | 0111 | 000101100 | 84 | 0100 | 001001011 |
| 40 | 1000 | 000110001 | 85 | 0101 | 001001101 |
| 41 | 1001 | 000110010 | 86 | 0110 | 001001110 |
| 42 | 1010 | 000110100 | 87 | 0111 | 001010011 |
| 43 | 1011 | 000111000 | 88 | 1000 | 001010101 |
| 44 | 1100 | 001000011 | 89 | 1001 | 001010110 |

FIG. 2A.

| No | PCM 12345678 | Code 123P45678 | No | PCM 12345678 | Code 123P45678 |
|---|---|---|---|---|---|
| 90 | 01011010 | 001011001 | 135 | 10000111 | 001010111 |
| 91 | 1011 | 001011010 | 136 | 1000 | 000111101 |
| 92 | 1100 | 001011100 | 137 | 1001 | 000111011 |
| 93 | 1101 | 010000111 | 138 | 1010 | 000110111 |
| 94 | 1110 | 010001011 | 139 | 1011 | 100010111 |
| 95 | 1111 | 010001101 | 140 | 1100 | 100011011 |
| 96 | 01100000 | 010001110 | 141 | 1101 | 100011101 |
| 97 | 0001 | 010010011 | 142 | 1110 | 100011110 |
| 98 | 0010 | 010010101 | 143 | 1111 | 011100011 |
| 99 | 0011 | 010010110 | 144 | 10010000 | 011100101 |
| 100 | 0100 | 010011001 | 145 | 0001 | 011100110 |
| 101 | 0101 | 010011010 | 146 | 0010 | 011101001 |
| 102 | 0110 | 010011100 | 147 | 0011 | 011101010 |
| 103 | 0111 | 100000111 | 148 | 0100 | 011101100 |
| 104 | 1000 | 100001011 | 149 | 0101 | 011110001 |
| 105 | 1001 | 100001101 | 150 | 0110 | 011110010 |
| 106 | 1010 | 100001110 | 151 | 0111 | 011110100 |
| 107 | 1011 | 100010011 | 152 | 1000 | 011111000 |
| 108 | 1100 | 100010101 | 153 | 1001 | 101100011 |
| 109 | 1101 | 100010110 | 154 | 1010 | 101100101 |
| 110 | 1110 | 100011001 | 155 | 1011 | 101100110 |
| 111 | 1111 | 100011010 | 156 | 1100 | 101101001 |
| 112 | 01110000 | 100011100 | 157 | 1101 | 101101010 |
| 113 | 0001 | 011100001 | 158 | 1110 | 101101100 |
| 114 | 0010 | 011100010 | 159 | 1111 | 101110001 |
| 115 | 0011 | 011100100 | 160 | 10100000 | 101110010 |
| 116 | 0100 | 011101000 | 161 | 0001 | 101110100 |
| 117 | 0101 | 111001000 | 162 | 0010 | 101111000 |
| 118 | 0110 | 111000100 | 163 | 0011 | 110100011 |
| 119 | 0111 | 111000010 | 164 | 0100 | 110100101 |
| 120 | 1000 | 110101000 | 165 | 0101 | 110100110 |
| 121 | 1001 | 110100100 | 166 | 0110 | 110101001 |
| 122 | 1010 | 110100010 | 167 | 0111 | 110101010 |
| 123 | 1011 | 110100001 | 168 | 1000 | 110101100 |
| 124 | 1100 | 101101000 | 169 | 1001 | 110110001 |
| 125 | 1101 | 101100100 | 170 | 1010 | 110110010 |
| 126 | 1110 | 101100010 | 171 | 1011 | 110110100 |
| 127 | 1111 | 101100001 | 172 | 1100 | 110111000 |
| 128 | 10000000 | 010011110 | 173 | 1101 | 111000011 |
| 129 | 0001 | 010011101 | 174 | 1110 | 111000101 |
| 130 | 0010 | 010011011 | 175 | 1111 | 111000110 |
| 131 | 0011 | 010010111 | 176 | 10110000 | 111001001 |
| 132 | 0100 | 001011110 | 177 | 0001 | 111001010 |
| 133 | 0101 | 001011101 | 178 | 0010 | 111001100 |
| 134 | 0110 | 001011011 | 179 | 0011 | 111010001 |

FIG. 2B.

| No | PCM 12345678 | Code 123P45678 | No | PCM 12345678 | Code 123P45678 |
|---|---|---|---|---|---|
| 180 | 10110100 | 111010010 | 224 | 11100000 | 101110111 |
| 181 | 0101 | 111010100 | 225 | 0001 | 101111011 |
| 182 | 0110 | 111011000 | 226 | 0010 | 101111101 |
| 183 | 0111 | 011100111 | 227 | 0011 | 110110111 |
| 184 | 1000 | 011101011 | 228 | 0100 | 110111011 |
| 185 | 1001 | 011101101 | 229 | 0101 | 110111101 |
| 186 | 1010 | 011101110 | 230 | 0110 | 110111110 |
| 187 | 1011 | 011110011 | 231 | 0111 | 111010111 |
| 188 | 1100 | 011110101 | 232 | 1000 | 111011011 |
| 189 | 1101 | 011110110 | 233 | 1001 | 111011101 |
| 190 | 1110 | 011111001 | 234 | 1010 | 111011110 |
| 191 | 1111 | 011111010 | 235 | 1011 | 110101111 |
| 192 | 11000000 | 101100111 | 236 | 1100 | 101101111 |
| 193 | 0001 | 101101011 | 237 | 1101 | 011101111 |
| 194 | 0010 | 101101101 | 238 | 1110 | 111001111 |
| 195 | 0011 | 101101110 | 239 | 1111 | 000101111 |
| 196 | 0100 | 101110011 | 240 | 11110000 | 001001111 |
| 197 | 0101 | 101110101 | 241 | 11110001 | 010001111 |
| 198 | 0110 | 101110110 | 242 | 11110010 | 100001111 |
| 199 | 0111 | 101111001 | 243 | 11110011 | 000111110 |
| 200 | 1000 | 101111010 | 244 | 11110100 | 101111110 |
| 201 | 1001 | 101111100 | 245 | 11110101 | 011111101 |
| 202 | 1010 | 110100111 | 246 | 11110110 | 011111110 |
| 203 | 1011 | 110101011 | 247 | 11110111 | 011111100 |
| 204 | 1100 | 110101101 | 248 | 11111000 | 000111111 |
| 205 | 1101 | 110101110 | 249 | 11111001 | 001011111 |
| 206 | 1110 | 110110011 | 250 | 11111010 | 010011111 |
| 207 | 1111 | 110110101 | 251 | 11111011 | 100011111 |
| 208 | 11010010 | 110110110 | 252 | 11111100 | 111011111 |
| 209 | 0001 | 110111001 | 253 | 11111101 | 110111111 |
| 210 | 0010 | 110111010 | 254 | 11111110 | 101111111 |
| 211 | 0011 | 110111100 | 255 | 11111111 | 011111111 |
| 212 | 0100 | 111000111 | | | |
| 213 | 0101 | 111001011 | | | |
| 214 | 0110 | 111001101 | | | |
| 215 | 0111 | 111001110 | | | |
| 216 | 1000 | 111010011 | | | |
| 217 | 1001 | 111010101 | | | |
| 218 | 1010 | 111010110 | | | |
| 219 | 1011 | 111011001 | | | |
| 220 | 1100 | 111011010 | | | |
| 221 | 1101 | 111011100 | | | |
| 222 | 1110 | 011110111 | | | |
| 223 | 1111 | 011111011 | | | |

FIG. 2C.

DIGITAL RECORDING APPARATUS

BRIEF DESCRIPTION OF THE PRIOR ART

The present invention relates to the transmission and/or recording of digital signals.

One problem which exists with the transmission and/or recording of digital signals is that it is necessary to synchronize the playback apparatus with the recording or transmission apparatus. In some applications, this can be overcome by use of a separate clock signal which is recorded or transmitted separately from the information signal. However, this solution is wasteful of bandwidth and is not viable in many circumstances.

SUMMARY OF THE INVENTION

The present invention provides apparatus for transmitting or recording digital signals comprising means for sampling an analogue signal to produce a plurality of digital words, means for converting each of said words to a coded word, and means for combining said coded words together in groups with at least one of said words of each group being ones complemented, there being a significant positive correlation between the coded words.

BRIEF DESCRIPTION OF THE DRAWING

Features and advantages of the present invention will become apparent from the following description of an embodiment thereof when taken in conjunction with the accompanying drawings, in which:

FIG. 2A-2C show a suitable code for use with the apparatus of FIG. 1.

DETAILED DESCRIPTION

Figure 1:
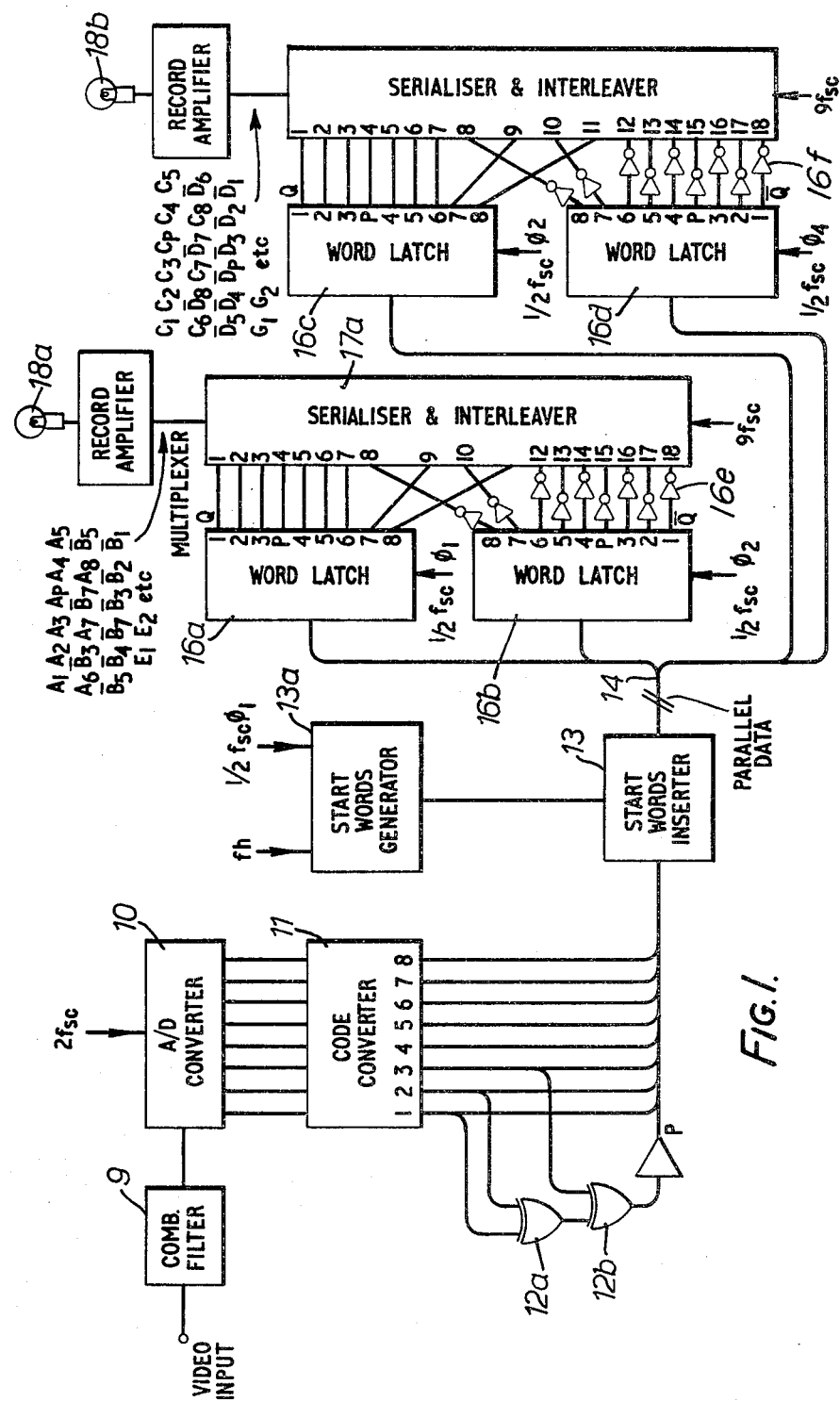
FIG. 1 shows a block diagram of apparatus for producing digital signals.

The preferred embodiment of the invention will be described in relation to its use for television video signals but it will be appreciated that the apparatus is of general use, for example for sound. When a video signal is converted to digital form the technique used herein is to sample the signal at equal time intervals and to convert each sample produced into a binary number, which will be assumed to have eight digits, the binary integer 'n' chosen can be considered to be that which makes a voltage nq most closely correspond to the sample; q, a quantum, is the difference between one representable level and the next.

For most purposes q would be a constant, but in some applications for example before gamma correction, it may be more advantageous for q to be a variable.

An eight digit binary number can represent the decimal numbers 0 to 255, 0 corresponding to 0000 0000 and 255 to 1111 1111. If a zero corresponds to zero volts and a '1' corresponds to one volt then for a Non-Return to zero (NRZ) code the DC component of the digital signal can vary from 0 to 1 volt.

A further problem can arise if repetition of numbers such as 0000 0000 occurs. In this case there would be no transitions and circuits relying on recovered clock signals could get out of step.

The method and apparatus used in the preferred embodiment are designed on the basis that there is a significant correlation between closely spaced points of a television picture defined by samples. As will be described in more detail later, the apparatus transmits two words in series along a path, one of the words being the ones complement to that word. Preferably, at least some of the bits of one word are interleaved with some of the bits of the ones complement of the other word, the words relating to a spatially near point of the picture. It is assumed that there is a significant positive correlation between the uncomplemented data, and a suitable binary code chosen accordingly.

The principle is to transmit along a path one word representing one point but to transmit adjacent to it and preferably to intersperse between its digit the ones complement of another word relating say to a spatially near point of the picture; the essential requirement being an expected significant positive correlation between the uncomplemented data. This would also permit the use of a signal one field later for example.

Normally the two words would be numerically close to one another but this does not ensure a sufficient number of transitions. To illustrate this point consider the two words representing 127 and 128; in normal binary from these are represented as 0111 1111 and 1000 0000. The second word when complemented becomes 0111 1111 so the two words when completely interdigitated are:

00 11 11 11 11 11 11 11 which only contains one transition.

This problem may be decreased by converting the words to a suitable code before complementing the bits of one of them, and remaining in this code until the critical parts of the equipment have been passed. The problem could only be serious with words approximately ⅜ or ⅝ of the total range apart and even then it would additionally require the DC component of one of the words to be low.

Often parity is used for error detection and concealment. Preferably this should be 'odd' parity of an odd number of bits. This is performed by modulo 2 adding say 3 or 5 bits together and if the sum is 0 the parity is '1' and vice versa. When such a parity bit is inserted in each word this increases the minimum number of transitions.

Referring now to FIG. 1, an analogue video input, for example a T.V. video signal, is fed through a comb filter 9 to an analogue to digital converter 10 which converts the video signal into a plurality of digital words by sampling the signal at a frequency of the video subcarrier, in this case at twice the video subcarrier frequency and assigning each sample to a level represented by an 8-bit digital word. Each word is then fed to a code converter 11 which converts each of the binary words to a suitable code, for example the code shown in FIG. 2. This is preferably achieved using a commercially available read only memory of a suitable capacity i.e. 256 locations each of 8-bits. After code conversion, a parity bit is inserted in each word by modulo 2 adding the first three bits of the word using the EXCLUSIVE OR gates 12a, 12b and then inverting the output by inverter 12c. The words including the parity bits are then fed in series to one input 13' of a start words inserter circuit 13 whose output is fed to four word latches 16a to 16d. The other input 13" of the start words inserter circuit 13 is fed from a start word generator circuit 13a operating at line frequency which produces a digital word to identify the start of a new line of video signals. The circuit 13 is constituted by a data selector switch operating at line frequency e.g. a Texas Instruments circuit SN 745157. The start words are used to synchronize operation of the playback apparatus (not shown) and are produced by the start word generator circuit 13a which can be in the form of a memory device such as a shift register or a random access or read only memory. In operation, when clocked at line frequency a start word in the form of a predetermined sequence of 1's and 0's is fed in parallel of the other input of the circuit 13. After a very short delay, the circuit 13 switches over to pass the coded words appearing at the input 13' to the output until the next line synch pulse is received whereupon the circuit 13 again switches to pass a start word appearing at the input 13" to the output of the circuit 13. Since the analogue signal being digitized is a television signal there is sufficient time at the start of each line of video for the start word to be inserted without having to latch the signals appearing at the input 13'. The word latches 16a to 16d in the form of D-type bistable circuits are arranged in pairs, to form the incoming words into groups of two words, one of each pair of latches passing the word exactly as it enters the latch, and the other producing the ones complement of the word entering the latch. Thus each group consists of two encoded words one of which is ones complemented.

The operation of the part of the circuit including the latches 16a and 16b will now be described, it being understood that the other part of the circuit is identical but used alternatively. When the first word is fed through the start words inserter 13 it is fed on to output lines 14 which are connected to all the word latches. Therefore depending on which latch is being clocked, the word will enter one of the latches.

Assume that the first word is clocked into latch 16a and the second word is clocked into latch 16b. The outputs from the latches are identical to the words fed into them but the outputs from the latch 16b are ones complemented by being fed through inverters 16e. The inverters 16e could equally well be at the inputs to the latch 16b. The output from the latches 16a and the ones complemented output from the latch 16b are then fed to a serializing and interleaving circuit 17a clocked at the bit frequency. A typical commercially available circuit for the circuit 17a is a Texas Instruments circuit code SN 745,150. The first word and the ones complement of the second word are interleaved to a degree which is determined before hand and in this case only the seventh and eighth bits of each word are interleaved. This is achieved by selecting the individual outputs from the latches and routing them to selected inputs of the circuit 17a to provide the desired interleaving as shown in the drawing. This has been found to give satisfactory results.

The degree of interleaving between the words can be altered, but this is determined by the code used. For example, the above code is not intended to be fully interleaved, in fact it was chosen so that only the seventh and eighth bits of the words would be interleaved.

The interleaved words are then fed as serial data to a recording head 18a via a record amplifier 19a for recording the digital signals on a recording medium, preferably magnetic tape.

Thus, the first two digital words, say A and B, are handled by the latches 16a,16b; the circuit 17a and the recording head 18a. The next two words, say C and D are handled in a separate channel constituted by the latches 16c,16d; inverters 16f; circuit 17b, record amplifier 19b and recording head 18b. With this system, every alternate coded word is ones complemented and then at least partially interleaved with its immediately preceding uncomplemented word. Since the operation of the channel including latches 16c and 16d is identical to that of the channel including latches 16c and 16d it will not be described in detail.

Referring now to FIG. 2 in more detail, this shows two columns for each number, the first being the number written as a binary number and the second being the code assigned to that binary number including the parity bit. From examination of the second column, it will be seen that for numbers between 21 and 234 inclusive, the maximum run length does not exceed three at the ends of the words and five within the words. This is acceptable only because it can be shown statistically that most words will fall between numbers 21 and 234.

Using the code shown in FIG. 2, the d.c. component is substantially reduced and so the clock signals can be recovered on playback.

The code can be used for colour video signals and although shown in a recording use, can also be used for the transmittion of digital video signals.

Referring again to FIG. 1, it will be seen that the digital signals are processed in two channels and that two recording heads 18a, 18b are used, one for each channel. This arrangement could be altered by feeding the outputs from both channels sequentially to a single recording head.

What is claimed is:

1. Digital recording apparatus, comprising
    (a) analogue to digital converter means (10) for converting an analogue signal to a plurality of digital words each including a plurality of binary digits;
    (b) code converter means (11) for converting each of said digital words to a corresponding coded word;
    (c) means (12a, 12b, 12c) for inserting a parity bit in each word, thereby to produce a resultant word;
    (d) start word inserter means (13a) for inserting within a series of the coded resultant words a digital start word;
    (e) latch means including pairs of word latches (16a, 16b; 16c, 16d) connected with the output of said start words inserter means, one latch of each pair being operable to pass a word exactly as it enters the latch means, and the other latch of that pair being associated with inserter means and operable to produce the ones complement of the word entering the latch, whereby a first word supplied to one latch exits that latch in the identical condition, and a second word supplied to the companion latch exits that latch in the ones complement condition;
    (f) serializing and interleaver means (17a, 17b) for at least partially interleaving the bits of the first word with the ones complemented bits of the second word;
    (g) means for combining the outputs of said latch means; and
    (h) means (19a,19b) for recording the interleaved combined words in a recording medium.

2. Digital recording apparatus according to claim 1, wherein the combining means performs a parallel to serial conversion and at least partially interleaves the words of each group.

3. Digital recording apparatus according to claim 1, wherein said latch means, said combining means and said recording means constitute one channel of a plural-channel recording apparatus, each channel including one of said latch means, said combining means, and said recording means, respectively.

4. Digital recording apparatus for recording a digital representation of a television video signal, comprising:
(a) code converter means (11) for receiving a succession of digital words each including a plurality of binary digits and having inputs and outputs which are equal in number and both equal to the number of binary digits in a word, said code converter means being operable to provide adjacent output coded words which are closely correlated in their d-c component for adjacent input digital words which are statistically probable;
(b) start word inserter means (13) for inserting within a series of the coded words a digital start word;
(c) latch means (16a-16d) including a pair of word latches connected with the output of the start word inserter means, one latch of the pair being operable to pass a word exactly as it enters the latch means, and the other latch of that pair being associated with inverter means (16e, 16f) and operable to produce the one complement of the word entering the latch, whereby a first word supplied to one latch exits that latch, in the identical condition, and a second word supplied to the comparison latch exits that latch in the ones complement condition;
(d) means (17a, 17b) for combining the outputs of said latch means; and
(e) means (18a, 18b) for recording the combined words in a recording medium.

* * * * *